June 19, 1923.

F. T. DOW 1,459,326

APPARATUS FOR AND METHOD OF DRYING OR OTHERWISE TREATING MATERIAL

Filed Nov. 1, 1919

Inventor.
Fred T. Dow
by Heard Smith & Tennant.
Attys.

Patented June 19, 1923.

UNITED STATES PATENT OFFICE.

FRED T. DOW, OF BANGOR, MAINE.

APPARATUS FOR AND METHOD OF DRYING OR OTHERWISE TREATING MATERIAL.

Application filed November 1, 1919. Serial No. 335,157.

*To all whom it may concern:*

Be it known that I, FRED T. DOW, a citizen of the United States, residing at Bangor, county of Penobscot, State of Maine, have invented an Improvement in Apparatus for and Methods of Drying or Otherwise Treating Material, of which the following description, in connection with the accompanying drawing, is a specification, like characters on the drawing representing like parts.

This invention relates to apparatus for and method of drying material in granular form or in relatively small masses or fragments, and has for its object to provide a novel method and apparatus for this purpose by which the material to be dried is held in suspension in a current of a medium which has the proper characteristics for giving the material the desired treatment.

The invention may be used for treating material for different purposes, such, for instance, as for drying the material, flavoring the material, moistening the material, etc. If the invention is used for drying the material, then the medium in which the material is held in suspension will be a drying medium. If the invention is to be used for moistening material, then the medium in which the material is held in suspension will be one capable of delivering moisture to the material, while if the apparatus is used for flavoring material, then the medium will contain the flavor of the desired character. In the following description, I will describe my invention as it could be used for drying material, but in view of what has been said above, it will be understood that the invention is not limited to treating material by drying.

In carrying out the process I propose to use a plurality of connected chambers which are preferably placed one above the other, and I provide for passing a current of heating medium upwardly through said chambers. The material to be dried is introduced into the upper chamber and is held in suspension in said chamber by the velocity of the current of drying medium. After the material has thus been held in suspension for a desirable length of time, it is allowed to pass into the chamber immediately beneath and it is retained in said chamber for a suitable period of time by being held in suspension in the current of drying medium. The material is then delivered to the next chamber and again retained therein for a desirable length of time by being held in suspension in the current of drying medium. It will thus be seen that the material to be dried is passed successively through the chambers and is retained in each chamber for a period of time.

The apparatus involved in carrying out this process is constructed so as to provide for this intermittent movement of the material from chamber to chamber and in the preferred embodiment of my invention this is accomplished by making each chamber so that the cross section area of its discharge end can be varied. When it is desired to transfer material from one chamber to another the discharge opening in the chamber containing the material is enlarged, thus reducing the velocity of the current of drying medium entering said opening to such an extent that it will not hold the material in suspension. As a result the material will gravitate through the discharge opening into the chamber below.

In order to give an understanding of my invention, I have illustrated in the drawings a selected embodiment thereof which will now be described, after which the novel features will be pointed out in the appended claims.

In the drawings, Fig. 1 is a vertical sectional view of a drier embodying my invention;

Figure 1:
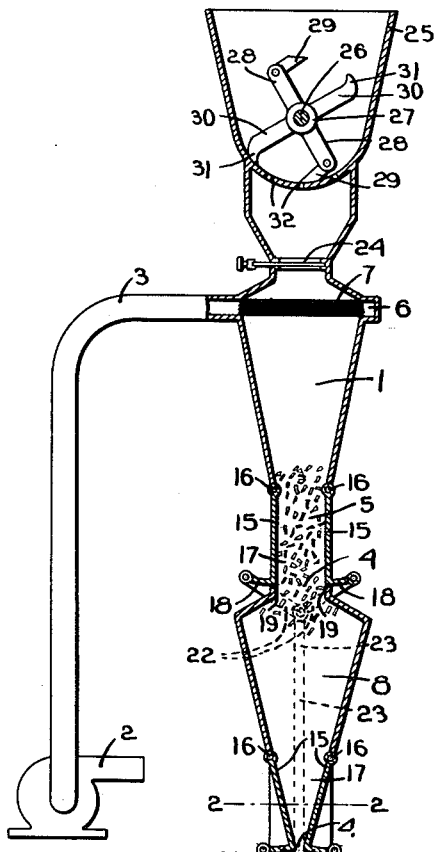
Figure 2:
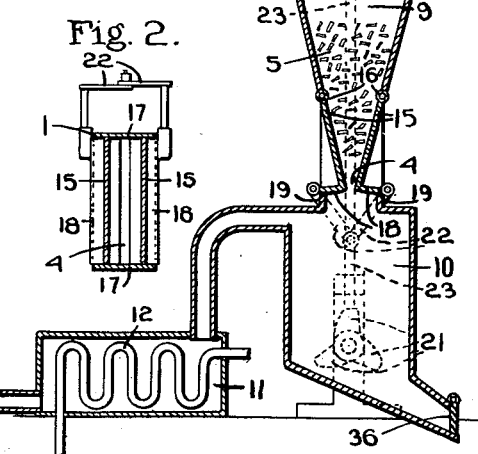
Fig. 2 is a section on the line 2—2, Fig. 1.
Figure 3:
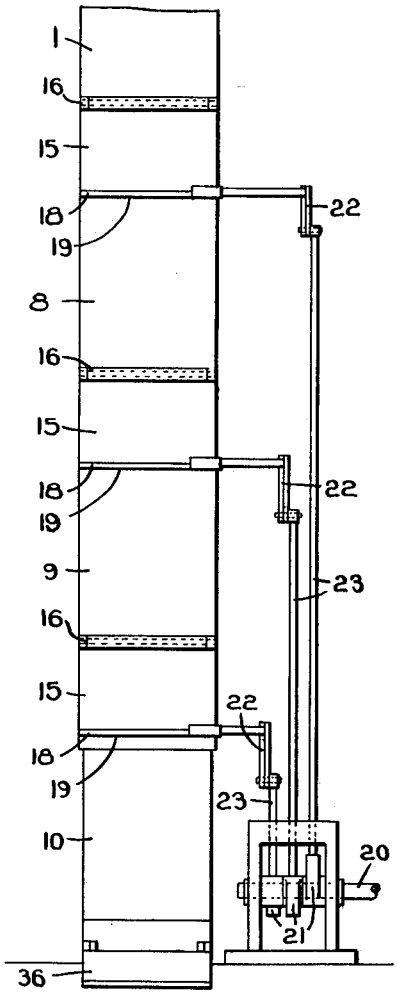
Fig. 3 is a side view of the device shown in Fig. 1.

The device shown in the drawing embodies a plurality of drying chambers situated one above the other and communicating with each other, but the invention is not limited to the use of a plurality of such drying chambers.

In order to give an understanding of the principle of the invention, I will refer first to the operation of one of the drying chambers indicated at 1. This drying chamber may have any suitable shape, but will preferably be tapered from the upper to the lower end thereof so that it has a smaller cross-sectional area at its lower end than at its upper end. The upper end of the chamber communicates by means of a pipe 3 with a suction apparatus 2. The lower end of the chamber 1 is open at 4 so that when the suction apparatus 2 is in operation the drying medium will be drawn into the lower open end of the chamber 1, through said chamber and out through the pipe 3. The chamber is constructed so that the lower open end thereof can be choked or contracted more or less for the purpose of causing the drying medium to enter the chamber through said choked opening 4 with considerable velocity.

The material 5 to be dried is in the form of relatively small fragments or pieces or may be in granular form, and during the drying operation the current of drying medium will enter the contracted inlet 4 with sufficient velocity so that the material 5 cannot settle at the opening. As the current of heating medium passes upwardly through the chamber 1, the velocity of said current will be decreased since the diameter of the chamber gradually increases.

The shape of the chamber 1 is such that before the drying medium reaches the upper end of the chamber and passes into the pipe 3, its velocity will have fallen to a point below that necessary to sustain the material 5 in suspension and so that none of the material 5 will be carried out through the delivery pipe 3. The greater portion of the material 5 will remain toward the lower end of the chamber 1, but because of the velocity of the drying medium entering said chamber, said material will be held in suspension and will be agitated more or less, thus greatly facilitating the drying operation.

I will preferably connect the pipe 3 with the chamber 1 through an annular passage 6 and will interpose a screen 7 of wire or fabric between the chamber 1 and said passage so as to prevent any dust or other small particles of material being drawn out by the blower. The provision of the annular passage 6 also produces an even suction at the upper end of said chamber.

Any suitable medium may be used for thus drying the material. Merely as a matter of illustration, I suggest the use of heated air. As stated above, I will preferably employ a plurality of drying chambers situated one above the other and communicating with each other, and will arrange to admit drying medium to the lower chamber, so that it will pass up through the chambers in succession. In the drawings, I have shown three chambers arranged one above the other and indicated at 1, 8 and 9, respectively, these chambers being so arranged that the necked inlet 4 of each chamber communicates with the top of the chamber immediately beneath it. Situated beneath the lower chamber 9 is a collecting chamber 10 in which the drying material is received. I have shown at 11 a heater for heating air, which heater is connected to the upper end of the collecting chamber 10 so that the drying medium passes into the collecting chamber, then up through the drying chambers, successively. This heater may have any suitable construction, and merely as illustrating one heater more or less conventionally, I have shown it as comprising a heating chamber in which is received a plurality of heating coils 12.

I have provided herein means for passing the material to be dried through the various chambers successively, so that after said material has remained in the upper chamber 1 for a sufficient length of time, it may be delivered to the chamber 8 in which it may be given a further drying operation, and then may be delivered to the chamber 9 where it will be still further dried, and then finally may be delivered to the collecting chamber 10. While any appropriate means for thus passing the material from one chamber to another may be employed, I prefer to use the construction herein illustrated. Each chamber is formed at its lower end in opposite sides with two swinging gates 15 that are pivoted to the sides at 16 and that play between the side walls 17 of the chamber 1. Each gate is formed with the curved portion 18 which is formed on the arc of a circle struck from the pivot 16 as a center, and which engages and makes a tight joint with the edge 19 of the opening in which the gate operates. During the drying operation these gates will be swung inwardly into the position occupied by the gates of chambers 8 and 9 in Fig. 1, thereby to form the contracted inlet opening 4. When it is desired to deliver the material in any chamber into the chamber immediately below it the gates for the upper chamber will be swung outwardly into the position shown by the gates of the chamber 1, thereby to enlarge the cross-sectional area of the inlet passage 4, and by doing so, the velocity of the drying medium entering said passage will be reduced to such a point that it will no longer suffice to hold the material 5 in suspension and said material will gravitate through the enlarged opening 4 into the chamber next below.

These gates 15 may be manipulated in any suitable way without departing from the invention. I would prefer, however, to provide a mechanism by which the gates for the various chambers will be operated successively, the gate from the lowest chamber into the hopper being opened first to allow the material in said lower chamber to drop into the collecting chamber, and when said gates are closed again, the gate of the chamber next above opening to allow the material from the latter chamber to gravitate into the lower chamber and so on until the material has been advanced from one chamber to another through the whole series of chambers. Any suitable means for automatically controlling these gates successively may be employed. As one simple means I have shown a shaft 20 having a plurality of cams 21 thereon, there being one cam for each set of gates. The wing portions 18 of each pair of gates are connected by a toggle device 22 situated outside of the chambers, and the central joint of this toggle device has pivoted thereto a thrust-rod 23 adapted to be actuated by one of the cams 21. Each pair of gates has a similar toggle device 22 and thrust-rod 23 connected thereto, and the various thrust-rods are situated to be actuated by the different cams 21. As the shaft 20 is rotated, each cam 21 raises its thrust-rod 23, thus straightening the corresponding toggle 22 and opening the gates away from each other. When the cam 21 passes from under the rod 23, the gates will close by the action of gravity on the toggle device and the rods. The cams 21 will preferably be so placed relative to each other on the shaft 20 that the gates will be opened successively, the gates for the lower chamber being opened first and then the gates for the chamber next above, and then the gates for the next higher chamber, and so on.

The material may be fed into the upper chamber 1 in any suitable way, depending somewhat on the nature of the material which is being dried. I have shown the chamber 1 as provided with a slide 24 which closes the upper end thereof and above this slide 24 will be received some suitable apparatus for delivering material to the chamber.

In the drawings I have shown a delivery apparatus which is well adapted to deliver peat or similar material to the drying apparatus in small pencil-like or stick-like fragments, but I wish it understood that this is only one form of delivery apparatus which may be used, as other forms can be used without departing from the invention.

25 indicates a hopper or receptacle having a curved bottom provided with a plurality of small apertures 32. 26 is a shaft extending through the receptacle and on which is a rotatable member 27 having a plurality of arms 28 carrying cutting elements 29 and other arms 30 each having a foot portion 31 provided with an eccentric face. As the shaft 20 rotates the knives 29 serve to cut and macerate the peat and the eccentric faces of the shoes 31 mash the peat and force it through the apertures 32 so that the peat may be delivered from the hopper in small strings or stick-like fragments. For treating peat, I find that best results can be secured where the apertures 32 are only an eighth to a quarter of an inch in diameter and the result is that as the peat is delivered from the hopper 25 onto the slide 24, it will have the form of small stick-like or pencil-like fragments. When the slide is opened, these fragments are delivered into the upper chamber by gravity, and will be partially dried therein, and then advanced through the other chambers, as described, so that by the time they are ready to be delivered from the lower chamber 9 into the collecting chamber 10 they are entirely dry.

I have referred above to my invention as applied to drying material, but the invention is equally applicable for treating material for other purposes than drying. If, for instance, it is desired to flavor the material it would be possible to treat the material as above described with a medium containing the desired flavor, or if it is desired to impart moisture to the material, then a medium in the nature of steam may be used. In any case, however, the method is the same, that is, the material to be treated is held in suspension in a current of a medium having the desired characteristics and by the velocity of said current, so that said current will cause a continual agitation of the material and thus dry, flavor, moisten or otherwise treat it.

I claim:

1. In an apparatus for treating material, the combination with a plurality of connected chambers, each adapted to contain material to be treated and having a progressively-increasing cross-sectional area from the bottom toward the top, said chambers being arranged in series and communicating with each other, means to cause a current of treating medium to pass through said chambers successively and at such a velocity as to hold the material in suspension in each chamber, and means to cause the material to be transferred periodically from chamber to chamber.

2. In an apparatus for treating material, the combination of a plurality of connected chambers arranged one above the other, each having a progressively-increasing cross-sectional area from the bottom toward the top, and each having in its bottom an inlet opening communicating with the top of the chamber below, means to cause a current of treating medium to pass upwardly through said chambers at such a velocity as to hold the material to be treated in suspension in each chamber, and means whereby the inlet at the bottom of any chamber may be enlarged, thereby to reduce the velocity of the treating medium entering said chamber to a point where it will fail to hold said material in suspension.

3. A drying apparatus comprising a chamber having a progressively-increasing cross-sectional area from the bottom toward the top and having a contracted inlet at its bottom and an outlet at its top, means to deliver a current of drying medium into said chamber through said inlet with sufficient velocity to hold the material to be dried in suspension, and means whereby the contracted inlet may be enlarged thereby to reduce the velocity of the drying medium to a point to allow the material to gravitate through said opening.

4. An apparatus for treating material comprising a plurality of connected chambers, each adapted to contain material to be treated and having a progressively-increasing cross-sectional area from the bottom toward the top, said chambers being arranged in series with the top of one chamber communicating with the bottom of the next chamber, and means to cause a current of treating medium to pass through said chambers successively and at such a velocity as to hold the material in suspension in each chamber.

5. The method of drying material in granular or fragmentary form which consists in introducing the material to be dried to the top chamber of a series of connected chambers, passing a current medium upwardly through said connected chambers at such velocity as to hold the material in suspension in said chamber and after a desirable length of time transferring said material to the next chamber below where it is again held in suspension by the current of drying medium, and repeating this operation in each successive chamber.

6. The method of drying material in granular or fragmentary form which consists in passing a current of drying medium upwardly through a series of connected chambers, holding the material to be dried in suspension in the current of drying medium in each chamber for a desirable length of time, and then transferring said material to the next succeeding chamber and there holding it in suspension in the drying current.

7. The method of drying material in granular or fragmentary form which consists in passing a current of drying medium upwardly through a series of connected chambers arranged one above the other, holding the material to be dried in suspension in said drying current for a desirable length of time in each chamber, and then allowing the material to gravitate to the chamber below, where it is again held in suspension in the drying current.

In testimony whereof, I have signed my name to this specification.

FRED T. DOW.